United States Patent [19]

Wlassics et al.

[11] Patent Number: 5,902,857
[45] Date of Patent: May 11, 1999

[54] FLUOROELASTOMERIC COMPOSITIONS

[75] Inventors: Ivan Wlassics, Rapallo; Vito Tortelli, Milan; Walter Navarrini, Boffalora Ticino; Margherita Albano, Milan, all of Italy

[73] Assignee: Ausimont S.p.A., Milan, Italy

[21] Appl. No.: 08/733,938

[22] Filed: Oct. 18, 1996

[30] Foreign Application Priority Data

Oct. 20, 1995 [IT] Italy .................................. MI95A2178

[51] Int. Cl.⁶ ...................................................... C08F 8/00
[52] U.S. Cl. ........................ 525/248; 525/276; 525/326.3; 525/370
[58] Field of Search ................................. 525/326.3, 370, 525/248, 276

[56] References Cited

U.S. PATENT DOCUMENTS

| | | | |
|---|---|---|---|
| 3,810,874 | 5/1974 | Mitsch et al. | 260/75 |
| 4,035,565 | 7/1977 | Apotheker et al. | 526/249 |
| 4,214,060 | 7/1980 | Apotheker et al. | 525/387 |
| 4,243,770 | 1/1981 | Tatemoto et al. | 525/331 |
| 4,501,869 | 2/1985 | Tatemoto et al. | 526/249 |
| 4,564,662 | 1/1986 | Albin | 526/247 |
| 4,694,045 | 9/1987 | Moore | 525/276 |
| 4,745,165 | 5/1988 | Arcella et al. | 526/247 |
| 4,789,717 | 12/1988 | Giannetti et al. | 526/209 |
| 4,831,085 | 5/1989 | Okabe et al. | 525/387 |
| 4,864,006 | 9/1989 | Giannetti et al. | 526/209 |
| 4,943,622 | 7/1990 | Naraki et al. | 526/206 |
| 5,173,553 | 12/1992 | Albano et al. | 526/238 |
| 5,656,697 | 8/1997 | Wlassics et al. | 525/326.3 |

FOREIGN PATENT DOCUMENTS

| | | |
|---|---|---|
| 0 136 596 | 4/1985 | European Pat. Off. . |
| 0 199 138 | 10/1986 | European Pat. Off. . |
| 0 407 937 A1 | 1/1991 | European Pat. Off. . |
| 0 410 351 A1 | 1/1991 | European Pat. Off. . |
| 0 661 304 A1 | 7/1995 | European Pat. Off. . |
| 0 638 149 A2 | 11/1995 | European Pat. Off. . |
| 0 638 149 A3 | 3/1996 | European Pat. Off. . |
| WO 93/22379 | 11/1993 | WIPO . |
| WO 95/28442 | 10/1995 | WIPO . |

OTHER PUBLICATIONS

I.L. Knunyants et al., "Izv. Akad, Nauk. SSSR", Ser, Khim, 1964(2), pp. 384–386.
Xiao X. Rong et al., "Reactivity of Fluorinated Alkyl Radicals in Solution. Some Absolute Rates of Hydrogen–Atom Abstraction and Cyclization", J. Am. Chem. Soc. 1994(116), pp. 4521–4522.

Primary Examiner—Bernard Lipman
Attorney, Agent, or Firm—Finnegan, Henderson, Farabow Garrett & Dunner

[57] ABSTRACT

Curing systems for fluoroelastomers curable by peroxidic route which comprise bromine, optionally iodine, the bromine always being higher than iodine, comprising as essential elements:

(I) a curing agent comprising a bis-olefin having general formula:

(I)

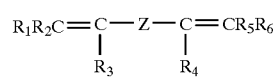

wherein:

$R_1$, $R_2$, $R_3$, $R_4$, $R_5$, $R_6$, equal to or different from each other, are H or alkyl $C_1$–$C_5$; Z is a linear or branched alkylenic or cycloalkylenic radical $C_1$–$C_{18}$, optionally containing oxygen atoms, or a (per) fluoropolyoxyalkylenic radical.

(II) a metallorganic hydride of formula:

(III)

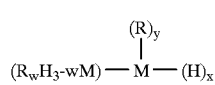

wherein: M is selected from Sn, Si, Ge, Pb; x is an integer from 1 to 3; y, z are zero or integers from 1 to 3, with the proviso y+z=4−x; w is an integer from 1 to 3; the R groups, equal to or different from each other, are selected from: alkyls $C_1$–$C_4$, aryls $C_6$–$C_{12}$, arylalkyls and alkylaryls $C_7$–$C_{14}$, optionally containing nitrile and/or hydroxyl groups.

10 Claims, No Drawings

FLUOROELASTOMERIC COMPOSITIONS

The present invention relates to new fluoroelastomeric compositions having improved processability and high thermal resistance at high temperatures.

It is known that fluoroelastomers curing can be carried out both ionically and by peroxides.

In the ionic curing, suitable curing agents, for instance polyhydroxylated compounds such as bisphenol AF, combined with accelerators such as for instance tetraalkylammonium, phosphonium or aminophosphonium salts, are added to the fluoroelastomer.

In the peroxidic curing, the polymer must contain curing sites capable of forming radicals in the presence of peroxides. Therefore cure-site monomers containing iodine and/or bromine are introduced in the chain, as described for instance in U.S. Pat. No. 4,035,565, U.S. Pat. No. 4,745,165 and EP 199,138, or in alternative to the indicated system or contemporaneously, in the polymerization phase, chain transfer agents containing iodine and/or bromine can be used, which give rise to iodinated and/or brominated chain ends, see for instance U.S. Pat. No. 4,243,770 and U.S. Pat No. 5,173,553. Curing by peroxidic route is carried out, according to known techniques, by addition of peroxides capable of generating radicals by heating, for instance dialkylperoxides, such as di-terbutyl-peroxide and 2,5-dimethyl-2,5-di(terbutylperoxy)hexane, etc.

Other products are then added to the curing blend, such as:

curing coagents, among which the most commonly used are triallyl-cyanurate and preferably triallylisocyanurate (TAIC), etc.;

a metal compound, selected from oxides or hydroxides of divalent metals, such as for instance Mg, Ca, etc.;

other conventional additives, such as mineral fillers, pigments, antioxidants, stabilizers and the like.

The ionically cured fluoroelastomers compared with the fluoroelastomers cured by peroxidic route have improved processability in terms of handmade products molding and improved thermal resistance at high temperatures.

As a matter of fact, by ionic curing, cured products are obtained which maintain good final properties, in particular thermal resistances also at temperatures higher than 250° C. The fluoroelastomers cured by peroxidic route can be used, instead, up to 230° C. since at higher temperatures they show a clear loss of the mechanical properties, in particular the elongation at break reaches variations higher than 100%. The peroxidic curing does not give therefore fluoroelastomers having thermal resistance higher than 230° C.

However the drawback of the ionic curing resides in that the handmade articles show lower chemical resistance than those obtained by peroxidic curing.

An object of the present invention is the obtainment of a blend showing improved processability during the handmade articles molding combined with an improved thermal resistance at high temperatures, higher than 200° C., in particular higher than 250° C., in fluoroelastomers cured by peroxidic route. The applications of said fluoroelastomers are those in the gaskets and seal rings field.

It has been surprisingly and unexpectedly found that it is possible to find a solution to the technical problem described above if a particular curing system as described hereunder is used.

Object of the present invention is a curing system for fluoroelastomers curable by peroxidic route which contain bromine, optionally iodine, the bromine always being higher than iodine, comprising as essential elements:

(I) a curing agent comprising a bis-olefin having general formula:

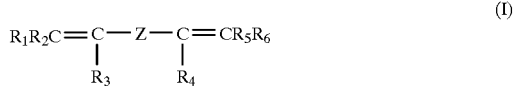

(I)

wherein:

$R_1$, $R_2$, $R_3$, $R_4$, $R_5$, $R_6$, equal to or different from each other, are H or alkyl $C_1$–$C_5$;

Z is a linear or branched alkylenic or cycloalkylenic radical $C_1$–$C_{18}$, optionally containing oxygen atoms, preferably at least partially fluorinated, or a (per)fluoropolyoxyalkylenic radical.

In the formula (I), Z is preferably a perfluoroalkylenic radical $C_4$–$C_{12}$, more preferably $C_4$–$C_6$ while $R_1$, $R_2$, $R_3$, $R_4$, $R_5$, $R_6$ are preferably hydrogen.

When Z is a (per)fluoropolyoxyalkylenic radical it comprises units selected from the following ones:

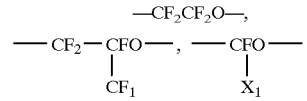

with $X_1$=F, $CF_3$; —$CF_2CF_2CF_2O$—, —$CF_2CF_2CH_2O$—.

Preferably the (per)fluoropolyoxyalkylenic radical is the following:

(II)

wherein: Q is an alkylenic or oxyalkylenic radical $C_1$–$C_{10}$; p is 0 or 1; m and n are such numbers that the m/n ratio is comprised between 0.2 and 5 and the molecular weight of said (per)fluoropolyoxyalkylenic radical is comprised between 500 and 10,000, preferably between 1,000 and 4,000. Preferably Q is selected from: —$CH_2OCH_2$—; —$CH_3O(CH_2CH_2O)_6CH_2$—, wherein s is an integer from 1 to 3.

The bis-olefins of formula (I) wherein Z is an alkylenic or cycloalkylenic radical can be prepared according to what described for instance by I. L. Knunyants et al in Izv. Akad. Nauk. SSSR, Ser. Khim., 1964(2), 384–6, while the bis-olefins containing (per)fluoropolyoxyalkylenic sequences are described in U.S. Pat. No. 3,810,874.

The amount of curing agent (i) is that sufficient for curing, which is generally comprised between 0.5–10% by weight with respect to the polymer, preferably 1–5% by weight.

(II) a metallorganic hydride of formula:

(III)

wherein: M is selected from Sn, Si, Ge, Pb; x is an integer from 1 to 3; y, z are zero or integers from 1 to 3, with the proviso y+z=4−x; w is an integer from 1 to 3; the R groups, equal to or different from each other, are selected from: alkyls $C_1$–$C_4$, aryls $C_6$–$C_{12}$, arylalkyls and alkylaryls $C_7$–$C_{14}$, optionally containing nitrile and/or hydroxyl groups, in amounts comprised between 0.2 and 10%, preferably between 0.5 and 2%, by weight with respect to the fluoroelastomer.

The hydrides of formula (III) are known compounds (see for instance J. Am. Chem. Soc., 116, (1994), pages 4521–4522). Those in which x=1 and w=3 are particularly preferred, for instance: tri(n-butyl)-tin-hydride, tri(ethyl)-silyl-hydride, di(trimethylsilyl)-silylmethyl-hydride, tri (trimethylsilyl)-silylhydride, and the like, or mixtures thereof.

The fluoroelastomers containing bromine, as already said, are known products. They contain bromine in amounts generally comprised between 0.001 and 5% by weight, preferably between 0.01 and 2.5% by weight with respect to the total weight of the polymer. The bromine atoms can be present along the chain and/or in terminal position.

To introduce bromine atoms along the chain, the copolymerization of the basic monomers of the fluoroelastomer is carried out with a suitable fluorinated comonomer containing bromine, cure-site monomer, see for instance U.S. Pat. No. 4,745,165, U.S. Pat. No. 4,831,085, and U.S. Pat. No. 4,214,060. Such a comonomer can be selected from instance from:

(a) bromo(per)fluoroalkyl-perfluorovinylethers of formula:

$$Br—R_f—O—CF=CF_2 \qquad (IV)$$

wherein $R_f$ is a (per)fluoroalkylene $C_1$–$C_{12}$, optionally containing chlorine atoms and/or ethereal oxygen; for instance: $BrCF_2$—O—CF=CF$_2$, $BrCF_2CF_2$—O—CF=CF$_2$, $BrCF_2CF_2CF$—O—CF=CF$_2$, $CF_3CFBrCF_2$—O—CF=CF$_2$, and the like;

(b) bromo-(per)fluoroolefins of formula:

$$Br—R'_f—CF=CF_2 \qquad (V)$$

wherein $R'_f$ is a (per)fluoroalkylene $C_1$–$C_{12}$, optionally containing chlorine atoms; for instance: bromotrifluoroethylene, 1-bromo-2,2-difluoroethylene, bromo-3,3,4,4-tetrafluorobutene-1, 4-bromo-perfluorobutene-1, and the like.

The units of brominated comonomer in the final polymer are present in amounts generally comprised between 0.01 and 3% by moles, preferably between 0.1 and 1% by moles.

In alternative or in addition to the brominated comonomer, the fluoroelastomer can contain bromine atoms in terminal position, deriving from a suitable brominated chain transfer agent introduced in the reaction medium during the preparation of the polymer, as described in U.S. Pat. No. 4,501,869. Such transfer agents have the formula $R_{f0}(Br)_{x0}$, wherein $R_{f0}$ is a (per)fluoroalkylic or chlorofluoroalkylic radical $C_1$–$C_{12}$, optionally containing chlorine atoms, while x0 is 1 or 2. They can be selected for instance from: $CF_2Br_2$, $Br(CF_2)_2Br$, $Br(CF_2)_4Br$, $CF_2ClBr$, $CF_3CFBrCF_2Br$, and the like. The bromine amount in terminal position is generally comprised between 0.001 and 1%, preferably between 0.01 and 0.5%, by weight with respect to the fluoroelastomer weight.

The fluoroelastomer can also contain optionally in addition to bromine also iodine atoms, iodine is generally comprised between 0.01 and 1% by weight with respect to the fluoroelastomer, preferably between 0.05 and 0.5% by weight.

The amount of curing agent (i) must be such as to involve bromine in the curing. Therefore the amount of iodine is generally lower than that of bromine and such that bromine takes part in the curing to obtain a polymer with good properties of the cured product.

The introduction of such iodine atoms can be carried out by addition of iodinated cure-site comonomers such as iodine olefins having from 2 to 10 C atoms, see for instance U.S. Pat. No. 4,035,565 and U.S. Pat. No. 4,694,045, iodofluoroalkylvinylethers, see U.S. Pat. No. 4,745,165 and U.S. Pat. No. 4,564,662, EP 95107005.1. Also iodine can be introduced as chain end by addition of iodinated chain transfer agents, such as $R_f(I)_{x'}(Br)_{y'}$, wherein $R_f$ has the meaning indicated above, x' and y' are integers comprised between 0 and 2, with $1 \leq x'+y' \leq 2$; x' being higher than 0, see for instance patents U.S. Pat. No. 4,243,770 and U.S. Pat. No. 4,943,622.

It is also possible to introduce iodine as chain end by using alkaline or alkaline-earth metals iodides and/or bromides according to EP patent application 407,937.

In combination with or in alternative to the chain transfer agents containing bromine, optionally iodine, other chain transfer agents known in the art, such as ethyl acetate, diethylmalonate, etc., can be used.

The fluoroelastomers are TFE or vinylidene fluoride (VDF) copolymers and at least a fluorinated olefin having a terminal unsaturation, containing at least a fluorine atom on each carbon atom of the double bond, the other atoms can be fluorine, hydrogen, fluoroalkyl or fluoroalkoxy from 1 to 10 carbon atoms, preferably 1–4 carbon atoms; or copolymers of fluorinated olefins as defined above; in both types a vinylether and/or non fluorinated olefins can be present. In particular the basic structure of the fluoroelastomer can be selected from:

(1) copolymers based on VDF, wherein the latter is copolymerized with at least a comonomer selected from: perfluoroolefins $C_2$–$C_8$, such as tetrafluoroethylene (TFE), hexafluoropropene (HFP); cloro- and/or bromo- and/or iodo-fluoroolefins $C_2$–$C_8$, such as chlorotrifluoroethylene (CTFE) and bromotrifluoroethylene; (per)fluoroalkylvinylethers (PAVE) $CF_2$=CFOR$_{f0}$ wherein $R_{f0}$ is a (per)fluoroalkyl $C_1$–$C_6$, for instance trifluoromethyl, bromodifluoromethyl, pentafluoropropyl; perfluoro-oxyalkylvinylethers $CF_2$=CFOX$_1$, wherein $X_1$ is a perfluoro-oxyalkyl $C_1$–$C_{12}$ having one or more ethereal groups, for instance perfluoro-2-propoxy-propyl; non fluorinated olefins (Ol) $C_2$–$C_8$, for instance ethylene and propylene;

(2) copolymers based on TFE, wherein the latter is copolymerized with at least a comonomer selected from: (per)fluoroalkylvinylethers (PAVE) $CF_2$=CFOR$_{f2}$, wherein $R_{f2}$ has the same meaning of $R_{f0}$; perfluoro-oxyalkylvinylethers $CF_2$=CFOX$_0$, wherein $X_0$ has the same meaning of $X_1$; fluoroolefins $C_2$–$C_8$ containing hydrogen and/or chlorine and/or bromine and/or iodine atoms; non fluorinated olefins (Ol) $C_2$–$C_8$, preferably ethylene.

Inside the classes defined above, preferred basic monomeric compositions are the following (% by moles):

(a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, 0–30% VDF; (f) TFE 32–60%, Ol 10–40%, PAVE 20–40%.

The fluoroelastomers can contain also monomeric units in the chain deriving from small amounts of a bis-olefin (i) as described in European patent application No. 94120504.9, generally 0.01–1% by moles with respect to the polymer.

Other fluoroelastomers which can be used are those having a high content of fluorine, which have for instance the following composition:

33–75% by moles of tetrafluoroethylene (TFE), preferably 40–60%;

15–45% by moles of a perfluorovinylether (PVE), preferably 20–40%;

10–22% by moles of vinylidene fluoride (VDF), preferably 15–20%.

The PVE have the formula: $CF_2=CFO-R_f$, with $R_f$, equal to perfluoroalkyl $C_1-C_6$, preferably $C_1-C_4$, or containing one or more ethereal groups $C_2-C_9$.

Of the polymers indicated above, the following ones based on VdF are for instance commercially known: VITON® GF, GBL 200, GBL 900 by Du Pont; TECNOFLON® P2, P819, PFR 91 by AUSIMONT.

The curing by peroxidic route is carried out, according to known techniques, by addition of peroxides capable of generating radicals by heating. Among the most commonly used peroxides we can cite: dialkylperoxides, such as for instance di-terbutyl-peroxide and 2,5-dimethyl-2,5-di(terbutylperoxy)-hexane; dicumyl peroxide; dibenzoyl peroxide; diterbutyl perbenzoate; di[1,3-dimethyl-3-(terbutylperoxy)butyl]-carbonate. Other peroxidic systems are described, for instance, in European patent applications EP 136,596 and EP 410,351.

Other products are then added to the curing blend, such as:

(a) optionally other curing coagents, besides the essential ones for the present invention, in amounts generally comprised between 0.01 and 5% by weight, preferably between 0.1 and 1%, by weight with respect to the polymer; among them those commonly used are: triallyl-cyanurate; triallyl-isocyanurate (TAIC); tris (diallylamine)-s-triazine; triallylphosphite; N,N-diallyl-acrylamide, N,N,N',N'-tetraallyl-malonamide; trivinyl-isocyanurate; 2,4,6-trivinyl-methyltrisiloxane, etc.; TAIC is particularly preferred;

(b) a metal compound, in amounts comprised between 1 and 15%, preferably between 2 and 10%, by weight with respect to the polymer, selected from oxides or hydroxides of divalent metals, such as for instance Mg, Zn, Ca or Pb, optionally combined with a salt of a weak acid, such as for instance stearates, benzoates, carbonates, oxalates or Ba, Na, K, Pb, Ca phosphites;

(c) other conventional additives, such as reinforcing fillers, pigments, antioxidants, stabilizers and the like.

The preparation of the fluoroelastomers object of the present invention can be carried out by copolymerization of the monomers in aqueous emulsion according to well known methods in the art, in the presence of radicalic initiators (for instance persulphates, perphosphates, or alkaline or ammonium carbonates or percarbonates), optionally with ferrous or silver salts or of other easily oxidizable metals. Surfactants, such as for instance (per)fluoroalkylic carboxylates or sulphonates (for instance ammonium perfluorooctanoate) or (per)fluoropolyoxyalkylenic, or others known in the art, are also present in the reaction medium.

When the polymerization is over, the fluoroelastomer is isolated from the emulsion by conventional methods, such as coagulation by addition of electrolytes or by cooling.

Alternatively, the polymerization reaction can be carried out in mass or in suspension, in an organic liquid wherein a suitable radicalic initiator is present, according to well known techniques.

The polymerization reaction is generally carried out at temperatures comprised between 25° and 150° C. under pressure up to 10 MPa.

The preparation of the fluoroelastomers object of the present invention is preferably carried out in aqueous emulsion in the presence of an emulsion, dispersion or microemulsion of perfluoropolyoxyalkylenes, according to U.S. Pat. No. 4,789,717 and U.S. Pat. No. 4,864,006, which are incorporated herein by reference.

The following examples are given for illustrative purposes but are not limitative of the scope of the present invention.

EXAMPLES 1–3

A rubber TECNOFLON® P2 (53% moles VDF, 23% moles HFP, 24% moles TFE), containing 0.59 by weight of bromine deriving from the introduction as comonomer of 2-bromo-perfluoroethylperfluorovinylether (BVE), having number average molecular weight equal to 64,000 and weight average molecular weight equal to 250,000, was used for the preparation of the curable compositions of the present invention.

To 100 g of such rubber were added:

3 phr of peroxide LUPERCO® 101 XL (2,5-dimethyl-2,5-di(terbutylperoxy)hexane);

4.3 phr of bisolefin BO having the formula $CH_2=CH(CF_2)_6CH=CH_2$;

1.07 phr of TBSI (tri-n-butyl-tin hydride) having the formula $[CH_3(CH_2)_3]_3S_n-H$;

5 phr of ZnO;

30 phr of carbon black MT.

The mixing was carried out in an open mixer. The composition of the blend and its Mooney viscosity (ASTM D1646-82) are reported in Table 1.

The curing curve was determined on the composition thus obtained by Oscillating Disk Rheometer (ODR) by Monsanto (100S Model), according to ASTM D2084-81, by operating at 177° C. with an oscillation amplitude of 3°.

The data (ODR) are reported in Table 1:

$M_L$ (minimum torque); $M_H$ (maximum torque); $t_{S2}$, (time required for an increase of the torque of 2 lb.in above $M_L$); t'50 and t'90 (time required for an increase of 50% and of 90%, respectively, of the torque).

On the cured product were determined and reported in Table:

the compression set on O-ring at 200° C. for 70 h after post-curing at 230° C. for (8 h+16 h) according to ASTM D395;

the mechanical properties after post-curing at 230° C. for 8 h+16 h according to ASTM D412-83.

Example 2

(Comparative)

Example 1 was repeated but the curing was carried out with triallyl isocyanurate (TAIC) (4 phr), conventional system known in the art instead of the curing system bisolefin BO and TBSI.

Example 2A (Comparative)

Example 1 was repeated but by utilizing only the bisolefin without using TBSI.

Example 3

Example 1 was repeated but by using 2.15 phr of tributyl-tin hydride (TBSI).

TABLE 1

|  |  | ex. 2 comp. | ex. 2A comp. | ex. 1 | ex. 3 |
|---|---|---|---|---|---|
| Blend composition |  |  |  |  |  |
| Polymer P2 | (g) | 100 | 100 | 100 | 100 |
| Luperco 101XL | (phr) | 3 | 3 | 3 | 3 |
| TAIC drymix | (phr) | 4 | — | — | — |
| BO | (phr) | — | 4.3 | 4.3 | 4.3 |
| TBSI | (phr) | — | — | 1.07 | 2.15 |
| ZnO | (phr) | 5 | 5 | 5 | 5 |
| Carbon Black MT | (phr) | 30 | 30 | 30 | 30 |
| Viscosity ML (1–10) at 121° C. ASTM D1646 Mooney (points) |  | 91 | 100 | 66, 7 | 62 |
| Blend characteristics ODR 177° C. arc 3° (ASTM D 2084-81) |  |  |  |  |  |
| ML | (lb. in) | 21.1 | 15.9 | 14 | 15.4 |
| MH | (lb. in) | 83.5 | 48.2 | 92 | 105.5 |
| tS2 | (sec) | 78 | 203 | 116 | 103 |
| t'50 | " | 150 | 363 | 230 | 216 |
| t'90 | " | 394 | 600 | 425 | 341 |
| Compression set at 200° C. x 70 h after post curing 230° C. x (8 + 16 h) (ASTM D395) |  |  |  |  |  |
| O-ring | (%) | 34 | 62 | 39 | 32 |
| Mechanical properties after post curing 230° C. x (8 + 16 h) (ASTM D 412-83) |  |  |  |  |  |
| Modulus at 100% | (MPa) | 4.9 | — | — | 11.4 |
| Stress at break | (MPa) | 16.5 | — | — | 18.9 |
| Elongation at break | (%) | 219 | — | — | 148 |
| Shore Hardness A | (points) | 7.1 | — | — | 74 |

From the results of the examples in Table 1 it can be noticed that the processability of the curing system of the present invention is clearly improved compared with the conventional peroxidic curing system (TAIC) as it is evident from the (ODR) data: ML, and by the Mooney blend.

From example 2A it is noticed that the bisolefin alone is not capable of giving a sufficient curing.

EXAMPLES 4–5

Example 4
Preparation of the polymer TECNOFLON® PER91
Preparation of the perfluoropolyoxyalkylenes microemulsion In a glass container equipped with stirrer 96.1 g of the compound having the formula:

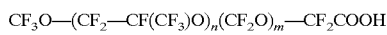

$$CF_3O—(CF_2—CF(CF_3)O)_n(CF_2O)_m—CF_2COOH$$

having n/m=10 and average molecular weight of 570, with 14.5 g of 30% NH$_4$OH by volume, were mixed. 29 g of demineralized water were then added. 16 g of GALDEN® having the formula:

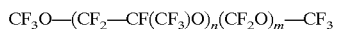

$$CF_3O—(CF_2—CF(CF_3)O)_n(CF_2O)_m—CF_3$$

were added to the so obtained blend, having n/m=20 and average molecular weight of 450. At a temperature comprised between 18° and 50° C. the mixture is in the form of microemulsion and appears as a limpid, thermodynamically stable solution.

Polymerization reaction

In a 10 l reactor, equipped with stirrer working at 545 rpm, 6500 g of water and the microemulsion of perfluoropolyoxyalkylenes prepared as described above, were fed after evacuation. The reactor was brought under pressure with a monomeric mixture having the following molar composition: 4% of VDF, 64% of perfluoromethylvinylether (PMVE); 32% of TFE. The temperature was maintained for the duration of the reaction at 80° C., the pressure at 25 relative bar.

0.26 g of ammonium persulphate (APS), dissolved in water, were then added as polymerization initiator. 13.92 g of 1,4 diiodoperfluorohexane dissolved in 25.56 g of GALDEN® D02 and 3.24 g of bromovinylether (BVE) were then added to the reaction mixture.

During the reaction the pressure was kept constant by feeding the monomers with the following molar ratios: VDF 17%, PMVE 38%, TFE 45%. 3.24 g of BVE were fed at every 5% increase of the conversion.

After 130 minutes from the beginning of the reaction 2920 g of polymer were obtained. The emulsion was discharged from the reactor, cooled at room temperature, and the polymer was coagulated by addition of an aqueous solution of aluminium sulphate. The polymer, separated and washed with water, was dried in air-circulating stove at 60° C. for 24 hours.

The characteristics of the obtained polymer are reported in Table 2.

TABLE 2

|  | EXAMPLE | 4 |
|---|---|---|
| Polymer composition |  |  |
| TFE | (% by moles) | 47 |
| PMVE | " | 33 |
| VDF | " | 20 |
| Br | (% by weight) | 0.4 |
| I | " | 0.23 |
| Mooney viscosity ML$^{121°\ C.}$ (1 + 10) (ASTM D1646) |  | 33 |

The polymer was then cured by peroxidic way: the blend composition and the characteristics of the cured product are reported in Table 3.

Example 5

The polymer of example 4 was formulated as indicated in Table 3 with the curing system of the invention by using the bisolefin of example 1.

The blend composition and the characteristics of the cured product are reported in Table 3.

TABLE 3

|  |  | ex. 4 comp. | ex. 5 |
|---|---|---|---|
| Blend composition |  |  |  |
| PRF 91 | (g) | 100 | 100 |
| Luperco 101XL | (phr) | 1.5 | 4 |
| TAIC drymix | " | 2 | — |
| BO | " | — | 4 |
| TBSI | " | — | 1.38 |
| ZnO | " | 5 | 5 |
| Carbon black MT | " | 15 | 15 |
| Blend characteristics ODR at 177° C., arc 3° (ASTM D2084-81) |  |  |  |
| ML | (lb. in) | 4 | 4 |
| MH | " | 102 | 119 |
| ts2 | (sec.) | 60 | 57 |
| t'50 | " | 78 | 162 |
| t'90 | " | 111 | 258 |

TABLE 3-continued

|  |  | ex. 4 comp. | ex. 5 |
|---|---|---|---|
| Mechanical properties after post curing at 200° C. × 8 h (ASTM D 412-83) | | | |
| Modulus at 100% | (MPa) | 5.5 | 7.7 |
| Stress at break | " | 16.6 | 15.3 |
| Elongation at break | (%) | 172 | 185 |
| Shore Hardness A | (points) | 66 | 77 |
| Mechanical properties after ageing at 275° C. × 70 h (ASTM D 573) | | | |
| Variation Modulus 100% | (%) | −58 | −17 |
| Variation stress at break | " | −58 | −31 |
| Variation elongation at break | " | 187 | 6 |
| Variation hardness | (points) | 1 | −2 |
| Compression set at 200° C. × 70 h after post curing at 200° C. for 8 hours (ASTM D395) | | | |
| O-Ring | (%) | 21 | 25 |

From the results of Table 3 it is clear that the thermal resistance of the cured product with the curing system of the present invention also at 275° C. results to be very high, in particular this can be noticed from the percent variations of the elongation at break.

On the contrary, the thermal resistance of the cured blend with the conventional systems of the art has resulted particularly worsened by passing from 200° C. to 275° C., see in particular the elongation data; this product therefore results unusable at the ageing temperature of 275° C.

We claim:

1. Curing systems for fluoroelastomers curable by peroxidic route which contain bromine, optionally iodine, the bromine always being higher than iodine, comprising as essential elements:

(i) a crosslinking agent comprising a bis-olefin having general formula:

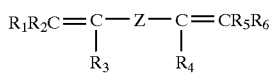

(I)

wherein:

$R_1$, $R_2$, $R_3$, $R_4$, $R_5$, $R_6$, equal to or different from each other, are H or alkyl $C_1$–$C_5$;

Z is a linear or branched alkylenic or cycloalkylenic radical $C_1$–$C_{18}$, optionally containing oxygen atoms, or a (per)fluoropolyoxyalkylenic radical; and (ii) a metallorganic hydride of formula:

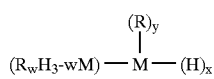

(III)

wherein: M is selected from Sn, Si, Ge, Pb; x is an integer from 1 to 3; y, z are zero or integers from 1 to 3, with the proviso y+z=4−x; w is an integer from 1 to 3; the R groups, equal to or different from each other, are selected from: alkyls $C_1$–$C_4$, aryls $C_6$–$C_{12}$, arylalkyls and alkylaryls $C_7$–$C_{14}$, optionally containing nitrile and/or hydroxyl groups; in amounts comprised between 0.2 and 10%.

2. Curing system for fluoroelastomers curable by peroxidic route which contain bromine, optionally iodine, the bromine always being higher than iodine, according to claim 1, wherein in the formula (I), Z is a perfluoroalkylenic radical $C_6$–$C_9$, or a (per)fluoropolyoxyalkylenic radical comprising units selected from the following ones:

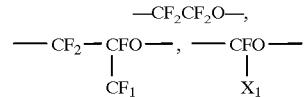

with $X_1$=F, $CF_3$; —$CF_2CF_2CF_2O$—, —$CF_2CF_2CH_2O$—; $R_1$, $R_2$, $R_3$, $R_4$, $R_5$, $R_6$ are hydrogen.

3. Curing system for fluoroelastomers curable by peroxidic route which contain bromine, optionally iodine, the bromine always being higher than iodine, acording to claim 2, wherein Z is a (per)fluoropolyoxyalkylenic radical of formula

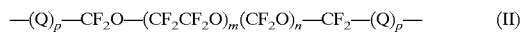

(II)

wherein: Q is a alkylenic or oxyalkylenic radical $C_1$–$C_{10}$; p is 0 or 1; m and n are such numbers that the m/n ratio is comprised between 0.2 and 5 and the molecular weight of said (per)fluoropolyoxyalkylenic radical is comprised between 500 and 10,000.

4. Curing system for fluoroelastomers curable by peroxidic route which contain bromine, optionally iodine, the bromine always being higher than iodine, according to claims 1–3, wherein (i) ranges from 0.5–10% by weight with respect to the polymer, (ii) ranges from 0.5–2% by weight with respect to the polymer.

5. Curing system for fluoroelastomers curable by peroxidic route which contain bromine, optionally iodine, the bromine always being higher than iodine, according to claims 1–4, wherein the fluoroelastomers are TFE or vinilydene fluoride (VDF) copolymers having at least a fluorinated olefin having a terminal unsaturation, containing at least a fluorine atom on each carbon atom of the double bond, the other atoms can be fluorine, hydrogen, fluoroalkyl or fluoroalkoxy from 1 to 10 carbon atoms, or copolymers of fluorinated olefins as defined above; in both types a vinylether and/or non fluorinated olefins can be present.

6. Curing system for fluoroelastomers curable by peroxidic route which contain bromine, optionally iodine, the bromine always being higher than iodine, according to claim 5, wherein the fluoroelastomers are selected from:

(1) copolymers based on VDF, wherein the latter is copolymerized with at least a comonomer selected from: perfluoroolefins $C_2$–$C_8$, such as tetrafluoroethylene (TFE), hexafluoropropene (HFP); cloro- and/or bromo- and/or iodo-fluoroolefins $C_2$–$C_8$, such as chlorotrifluoroethylene (CTFE) and bromotrifluoroethylene; (per)fluoroalkyllvinylethers (PAVE) $CF_2$=$CFOR_{f0}$, wherein $R_{f0}$ is a (per)fluoroalkyl $C_1$–$C_6$, for instance trifluoromethyl, bromodifluoromethyl, pentafluoropropyl; perfluorooxyalkylvinylethers $CF_2$=$CFOX_1$, wherein $X_1$ is a perfluoro-oxyalkyl $C_1$–$C_{12}$ having one or more ethereal groups, for instance perfluoro-2-propoxy-propyl; non fluorinated olefins (Ol) $C_2$–$C_8$, for instance ethylene and propylene;

(2) copolymers based on TFE, wherein the latter is copolymrized with at least a comonomer selected from: (per)fluoroalkylvinylethers (PAVE) $CF_2$=$CFOR_{f2}$, wherein $R_{f2}$ is defined as above; perfluorooxyalkylvinylethers $CF_2=CFOX_0$, wherein $X_0$ is defined as above; fluoroolefins $C_2-C_8$ containing hydrogen and/or chlorine and/or bromine and/or iodine atoms; non fluorinated olefins (Ol) $C_2-C_8$, preferably ethylene.

7. Curing system for fluoroelastomers curable by peroxidic route which contain bromine, optionally iodine, the bromine always being higher than iodine, according to claims 5 and 6, wherein the basic monomeric compositions are the following (% by moles):

(a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, 0–30% VDF; (f) TFE 32–60%, Ol 10–40%, PAVE 20–40%;

33–75% by moles of tetrafluoroethyene (TFE);
15–45% by moles of a perfluorovinylether (PVE);
10–22% by moles of vinylidene fluoride (VDF).

8. Fluoroelastomers curable by peroxidic route which contain bromine, optionally iodine, the bromine always being higher than iodine, comprising as curing system the one of claims from 1 to 7.

9. Fluoroelastomers cured by peroxidic route which contain bromine, optionally iodine, the bromine always being higher than iodine, comprising as curing system the one of claims from 1 to 7.

10. Cured fluoroelastomers according to claim 9, in which the fluoroelastomers are in the form of gaskets and sealing rings.

* * * * *

UNITED STATES PATENT AND TRADEMARK OFFICE
CERTIFICATE OF CORRECTION

PATENT NO. : 5,902,857
DATED : May 11, 1999
INVENTOR(S) : Wlassics et al.

It is certified that error appears in the above-indentified patent and that said Letters Patent is hereby corrected as shown below:

Claim 6, column 10, line 56, "$CF_2=CFOR_{fo}$" should read --$CF_2=CFOR_{f'o}$--, and "$R_{fo}$" should read --$R_{f'o}$--.

Signed and Sealed this

Twenty-sixth Day of October, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,902,857

DATED : May 11, 1999

INVENTOR(S) : Ivan WLASSICS et al.

It is certified that error appears in the above-indentified patent and that said Letters Patent is hereby corrected as shown below:

Claim 2, column 10, line 5, "$C_6$-$C_9$" should read -- $C_4$-$C_8$ --;

lines 9-11, "-$CF_2$-CFO-" should read -- -$CF_2$-CFO- --.
$\quad\quad\quad\quad\quad\quad\quad\quad\ \ |\quad\quad\quad\quad\quad\quad\quad\quad\quad\quad\quad\ \ |$
$\quad\quad\quad\quad\quad\quad\quad\quad CF_1\quad\quad\quad\quad\quad\quad\quad\quad\quad\ CF_3$ Signed and Sealed this Twenty-seventh Day of March, 2001

Attest:

NICHOLAS P. GODICI

Attesting Officer

Acting Director of the United States Patent and Trademark Office